(12) United States Patent
Mathews

(10) Patent No.: US 8,793,048 B2
(45) Date of Patent: Jul. 29, 2014

(54) APPARATUS AND METHOD FOR ANALYZING MULTIPLE FAULT OCCURRENCE OF MULTIPLE-STATE DEVICE

(75) Inventor: Thomas E. Mathews, Pendleton, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 11/964,488

(22) Filed: Dec. 26, 2007

(65) Prior Publication Data

US 2009/0171527 A1 Jul. 2, 2009

(51) Int. Cl.
*G01M 17/00* (2006.01)
*G06F 7/00* (2006.01)
*G06F 19/00* (2011.01)

(52) U.S. Cl.
USPC ....... 701/31.6; 701/29.1; 701/29.2; 701/29.6; 701/31.8

(58) Field of Classification Search
USPC ........ 701/29, 30, 31, 35, 51, 29.1, 29.2, 29.4, 701/29.6, 31.6, 31.8, 31.9, 32.1, 32.8, 34.4; 702/186; 475/119; 477/34
See application file for complete search history.

(56) References Cited

U.S. PATENT DOCUMENTS

| | | | |
|---|---|---|---|
| 5,129,259 A | | 7/1992 | View |
| 5,272,704 A * | | 12/1993 | Tong et al. ....................... 714/26 |
| 5,587,930 A * | | 12/1996 | Hori et al. ...................... 702/185 |
| 5,806,056 A * | | 9/1998 | Hekmatpour ................... 706/50 |
| 6,081,760 A | | 6/2000 | Dreibholz |
| 6,450,591 B1 | | 9/2002 | Kawahata |
| 6,981,182 B2 * | | 12/2005 | Roddy et al. ..................... 714/47 |
| 7,239,946 B2 * | | 7/2007 | Sowa ............................... 701/29 |
| 7,328,092 B2 * | | 2/2008 | Eggert et al. .................... 701/29 |
| 7,409,317 B2 * | | 8/2008 | Cousin et al. .................. 702/183 |
| 7,590,476 B2 * | | 9/2009 | Shumate ......................... 701/29 |
| 2006/0030446 A1* | | 2/2006 | Nozaki et al. ................. 475/119 |
| 2007/0011113 A1* | | 1/2007 | Mosleh et al. .................. 706/14 |
| 2007/0232432 A1 | | 10/2007 | Yoneyama |
| 2007/0276560 A1* | | 11/2007 | Reichwein et al. ............. 701/29 |
| 2007/0276631 A1* | | 11/2007 | Subramanian et al. ........ 702/186 |
| 2007/0294001 A1* | | 12/2007 | Underdal et al. ............... 701/29 |

FOREIGN PATENT DOCUMENTS

EP 0335380 A2 3/1989

OTHER PUBLICATIONS

An Introduction to failure mode and effects analysis by Anthony Gojanovic 1996.*

* cited by examiner

*Primary Examiner* — Rami Khatib

(57) ABSTRACT

Apparatus, and an associated method, for analyzing operation of a multiple-state device, such as a vehicular automatic transmission under multiple-fault occurrence. An identifier identifies all possible path sequences of an initial state responsive to occurrence of all possible faults and all possible remediation actions. The paths are identified for a multiple-fault occurrence of two or more faults. For each of the possible paths, a hazard level is assigned, and the hazard levels are sorted to obtain preferred path sequences. Analysis of the possible paths and their associated hazard levels is made, and a state control scheme is formulated.

20 Claims, 3 Drawing Sheets

APPARATUS AND METHOD FOR ANALYZING MULTIPLE FAULT OCCURRENCE OF MULTIPLE-STATE DEVICE

The present invention relates generally to a manner by which to analyze a multiple-state device, such as a vehicular, automatic transmission under multiple fault occurrence conditions. More particularly, the present invention relates to an apparatus, and an associated method, by which to identify hazard levels for remediation actions available to be taken responsive to the occurrence of the multiple faults.

Hazard levels associated with all possible remediation actions available to be taken in response to combinations of the multiple faults and remediation actions are identified. Analysis of the hazard levels improves selection of the remedial action to be taken by the vehicular transmission, or other multiple-state device.

BACKGROUND OF THE INVENTION

Many mechanical devices, other devices that include mechanical components, as well as other types of devices, are capable of operation in any of various states of a plurality of operational states. The allowable state transitions define the allowable state changes that the device is permitted to undergo. The permitted state changes and the permitted states define operation of the device.

A vehicular automatic transmission assembly is exemplary of a device can be represented by operational states and state transitions therebetween. The operational states include, for instance, operational states, and sub-states, associated with the gear positionings of the transmission. The operational states of the vehicular transmission also include states into which the transmission is required to transition in the event of a fault condition. The transition is dependent, not only upon the initial state, but also the type of fault condition. If the fault condition is severe, the transition is to a state that limits further deleterious operation. Conversely, if the fault is minor, the transition is to a state that does not affect continued operation. In other words, the state into which the device is caused to transition responsive to the fault condition is dependent upon the severity of the fault condition.

A vehicular, automatic transmission assembly is conventionally controlled by control apparatus that includes a set of valves. Appropriate closing and opening of specific valves are determinative of the gear positioning of the transmission. Monitoring of the transmission valves is carried out through use of pressure sensors through sensing of pressure levels at locations of the transmission assembly. Sensed pressures are indicative, for instance, of the actual positionings of the valves.

Transmission assemblies are constructed and controlled in manners to minimize safety consequences in the event of occurrence of any of various single points of failure in the transmission assembly and its operation. In the event of occurrence of a fault, the controller of the transmission assembly, such as through operation of pre-determined algorithms, limit operation of the transmission assembly to safe operations so that the vehicle is not damaged and safety is not compromised. While the controller controls the automatic transmission assembly operation to ensure best safe operation, both of the vehicle and to limit damage to the transmission assembly, competitive, and other, pressures compel manufacturers to limit the vehicular operator's exposure to the fault and associated remedies to the fault so as not to cause creation of a negative perception of the transmission assembly. By way example, in the event that a particular clutch control valve fails, a diagnostics algorithm of the transmission controller determines what remedial action to take. For instance, available, remedial actions responsive to the clutch control valve failure includes the shutting down of the vehicle, forcing the vehicle to travel at a reduced speed, or merely setting of an annunciation light. The selection is made, of the available remediations, of the least-invasive, but safe, option.

While control schemes for transmission assemblies and failure-mode analysis thereof, are known and utilized, analysis and controls generally have not fully considered the ramifications and safety impacts of multiple fault occurrences. That is to say, successive faults, or at least one fault subsequent to a first fault occurrence, have generally not been fully analyzed. Ramifications of the subsequent fault occurrences are sometimes therefore not properly controlled in an optimal manner. An analysis would require the determination of all possible permutations of primary faults, remedial actions, subsequent operations, and secondary faults. A very large number of permutations, each requiring consideration, might result. And, if manually evaluated, the evaluations might well be error-prone. And, with each change in remediation operation, the entire analysis might well need to be re-performed. As a result, analysis of the multiple fault occurrence has, to date, generally not been made. If a manner could be provided by which better to analyze multiple fault occurrence of a multiple-state device, improved selection of remediation would be facilitated.

It is in light of this background information related to multi-state devices, that the significant improvements of the present invention have evolved.

SUMMARY OF THE INVENTION

The present invention, accordingly, advantageously provides an apparatus, and an associated methodology, by which to analyze a multiple-state device, such as a vehicular, automatic transmission, under multiple-fault-occurrence conditions.

Through operation of an embodiment of the present invention, a manner is provided by which to identify hazard levels for remediation actions available to be taken responsive to occurrence of the multiple faults.

In one aspect of the present invention, hazard levels associated with all possible remediation actions that are available at the device to be taken in response to all combinations of the multiple faults and remediation actions are identified. Once identified, the analysis of the hazard levels permits improved selection of remedial action to be taken by the multiple-state device.

In another aspect of the present invention, all of the possible states of the multiple-state device are identified. And, for each state, a set of all possible faults is also identified. A hazard level is assigned for each state. And, a list of possible faults, including false detections, together with a remedial action for each fault, is provided. A list of hazard scores for certain hazardous transitions is further provided.

In another aspect of the present invention, for each of the operational states of the multi-state device, each possible fault that can occur at the state is induced. And, for each fault induced at each possible operating state, a remedial action is applied that defines a remedied state.

In another aspect of the present invention, a hazard score is provided for each remediation action taken responsive to each induced fault. The score is representative of the hazard associated with each fault and its remediation action. The hazard score, in one implementation, is of a value of a selected one of a value representative of the inherent hazard of the remedied state and the hazard created by inadvertently transitioning from the initial state to the remedied state. The hazard score, for example, is selected to be the value that is the greater of the inherent hazard of the remedied state and the value of the hazard created by inadvertently transitioning from the initial state to the remedied state. Each operating state, fault, remediation action, and resultant remedied state constitutes a possible first fault and remediation.

In another aspect of the present invention, subsequent fault and remedial action is further analyzed. That is to say, the additional analysis provides for analysis of multiple-fault occurrence, such as the occurrence of successive faults at the multiple-state device. The analysis is iteratively carried out. That is to say, the analysis in which identification is made of a new initial state, each fault condition possible thereat, and each possible remedial action leading to a remediation state is identified. In this second iteration, the set of faults is reduced to exclude the existing fault, i.e., the prior fault from whose occurrence and associated remediation led to the new, initial state. In the second iteration, e.g., the set of normal operating states is reduced as certain states are excluded by the prior remedial action. For each remaining possible state, remaining possible faults, and remediations therefrom, new remediation states are defined.

In another aspect of the present invention, a hazard score is further created for the additional fault and remediation. The hazard score, in one implementation, is of a value corresponding to one of the inherent hazard of the remedied state or the hazard created by inadvertently transitioning from the new, initial state to the remedied state. The hazard score, for instance, forms the greater of the values.

The hazard score for the multiple-fault occurrence is the combination, e.g., summation, of the hazard scores associated with each fault, and remediation, occurrence. The hazard scorer, at least on a comparative basis, identifies the hazard associated with the multiple fault occurrence and associated remediation. Through comparison of the respective hazard scores for the respective paths defined by the initial states, faults, and remediations, control schemes are developed for the multiple-state device. The control scheme controls operation of the device so that the device is caused, upon occurrence of a fault, to be transitioned into an optimal remediation state, or states, determined by the hazard score. A sorter, for instance, is provided by which to sort the possible combinations to determine, such as by a quantitative listing, the preferable state paths for each of the successive states, i.e., initial states and subsequent remediation states.

In one implementation, the multiple-state device forms a vehicular, automatic transmission in which multiple states, including gear-associated states are defined. Analysis of the transmission states upon multiple fault occurrence provides indication of preferable control paths, i.e., preferable remediation actions for the multiple fault scenarios. Through proper analysis, and transmission control implementation, optimal operation of the transmission responsive to multiple fault occurrence is quantitatively selected and caused.

In these and other aspects, therefore, an apparatus, and an associated methodology, is provided for facilitating analysis of a multiple-state device responsive to multiple fault occurrence. An identifier is configured to identify, for states of the multiple-state device and fault occurrences possible at the states, available remediation action. A hazard scorer is configured to provide a representation of a hazard level associated with each available remediation action.

A more complete appreciation of the scope of the present invention and the manner in which it achieves the above-noted and other improvements can be obtained by reference to the following detailed description of presently preferred embodiments taken in connection with the accompanying drawings that are briefly summarized below, and by reference to the appended claims.

DETAILED DESCRIPTION

Figure 1:
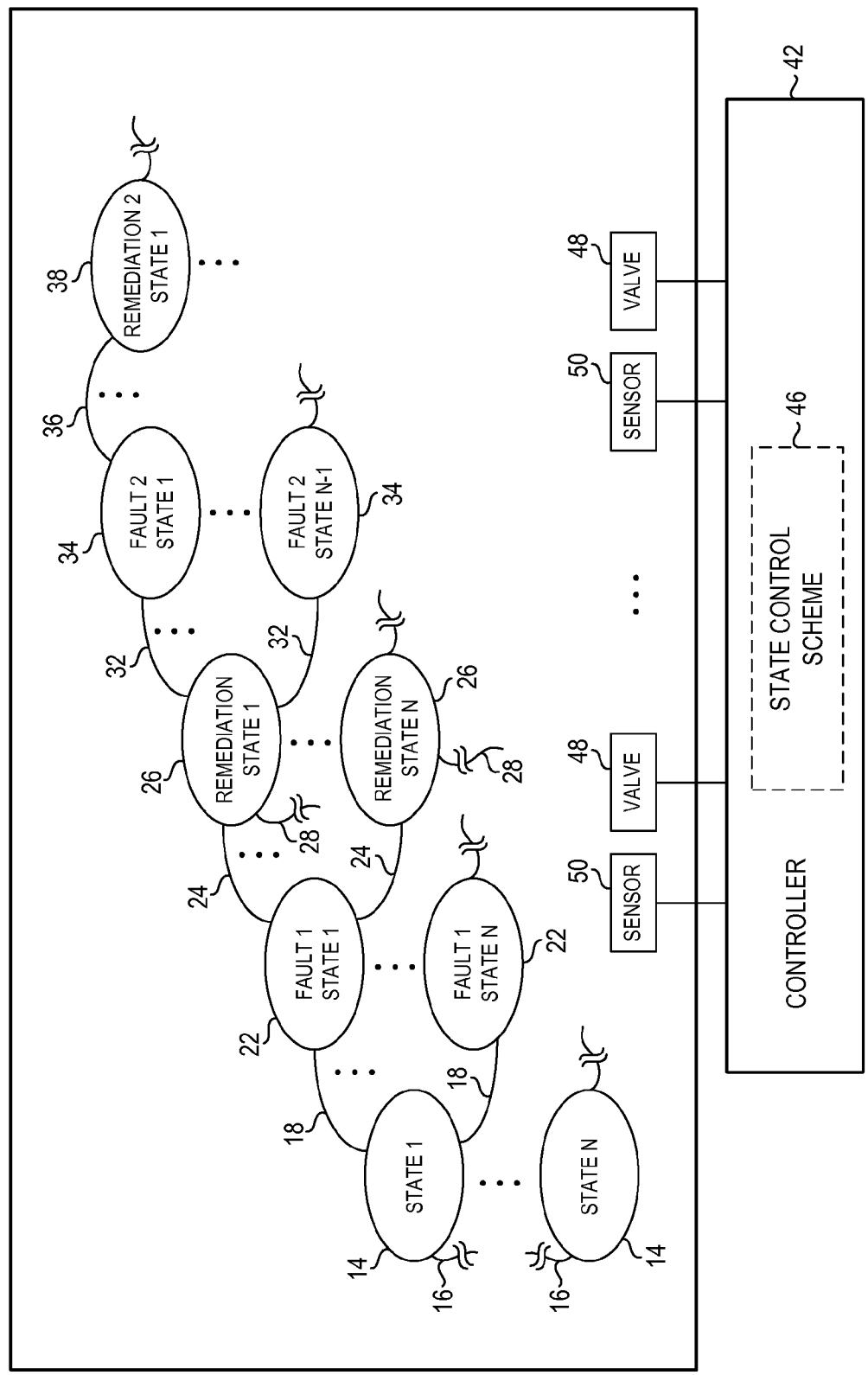
FIG. 1 illustrates a partial functional block, partial state diagram of an exemplary apparatus that operates responsive to analysis provided pursuant to operation of an embodiment of the present invention.

Referring first to FIG. 1, a vehicular, automotive transmission, shown generally at 10, is representative of a multiple-state device, capable of operation in multiple states. The following description shall describe operation with respect to the exemplary implementation in which the multiple-state device forms a vehicular transmission. More generally, the device 10 is representative of a device capable of operation in multiple states.

The transmission 10, operable in the multiple states, is here shown to include a plurality of normal operating states 14. The normal operating states 14 are, e.g., associated with the gear positions of the transmission. The first normal operating state (state 1) 14 shows a plurality of transitions 16 to other operating states. In the event of occurrence of a fault at the operating state, state 1, the transmission transitions, indicated by the segments 18 to fault states (fault 1 states) 22. The fault states are representative of the fault-states of operation, caused by the underlying fault. And, for each fault, and corresponding fault state, remediation transitions, indicated by the lines 24, are possible to transition out of the fault state operation into remediation states (remediation states) 26 and subsequent operation in a remediation state. The number of paths through the state representation of the transmission is dependent upon the number of states, the number of possible faults per state, and the number of remediations possible per fault state. If the numbers are large, a significant number of possible paths are possible, any of which might be representative of occurrence during actual operation of the transmission.

A remediation state might be a normal operating state or a state associated with "safe operation" to ameliorate problems that might occur as a result of the occurrence of the underlying fault. A normal state transition might subsequently be taken to transition the remediation state to a normal or other, operating state, as indicated by the lines 28 extending from the remediation states 26. The lines 28 extend, e.g., to a state 14, another remediation state, or any other allowable state. Or, upon occurrence of a fault, a fault transition 32 is taken to another fault state (fault 2 state) 34. And, thereafter, responsive to remediation transitions 36, the transmission transitions to a remediation state (remediation state) 38. Again, while a number of possible paths that might be taken is dependent upon the number of possible faults and remediations therefrom, the number of possible paths is potentially quite large.

The transmission 10 further includes a controller 42 that controls aspects of operation of the transmission. The controller forms a state controller that controls, here the states into which the transmission is permitted to be transitioned. The controller controls operation in conformity with a state control scheme 46. The state control scheme, pursuant to an embodiment of the present invention, is created as a result of the analysis of the possible paths and selection of the paths through the states of the transmission that provide for best operation according to selected operational criteria. For instance, responsive to analysis of the possible paths, paths for the various occurrences of multiple faults, e.g., successive faults, that cause the transmission to be operated with optimal possible levels of hazard, howsoever defined. The controller controls value positionings of value 48 and is provided with sensed information sensed by sensors 50.

Figure 2:
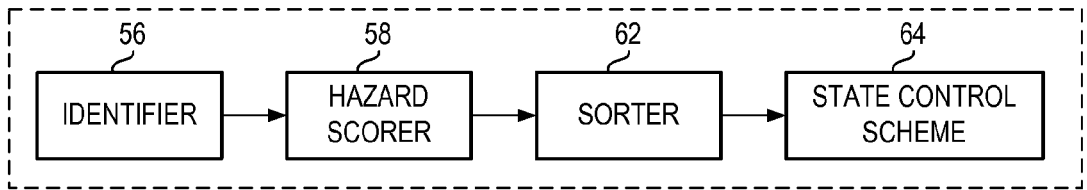
FIG. 2 illustrates a functional block diagram of an embodiment of the present invention.

FIG. 2 illustrates an apparatus 52 of an embodiment of the present invention that operates to facilitate analysis of the possible paths through states of the transmission. More generally, the apparatus is representative of a mechanism that facilitates the analysis of paths through any of various multiple-state devices. The apparatus is represented in terms of functional entities that are implementable in any desired manner, including by algorithms executable by processing circuitry. The elements of the apparatus are implementable at a single physical location or, alternately, distributed amongst more than one physical location. Here, the apparatus is shown to be formed of an identifier 56, a hazard scorer 58, a sorter 62, and a state control scheme listing 64.

The identifier 56 operates to identify each of the possible paths defined by multiple fault occurrence and remediations therefrom. As mentioned previously, when the vehicular transmission is defined by a plurality of states, a plurality of faults is possible for each state, and a plurality of remediations possible to remediate from each fault state, a large number of possible paths are possible. The identifier iterates through each possible combination of fault and remediation therefrom for a particular state. And, for each remediation state, or available state subsequent to remediation, the procedure is again performed to identify every possible fault and remediation therefrom from each of the initial remediation states, or other states. While a two-stage identification procedure is carried out in the exemplary implementation to identify possible paths in a two-fault occurrence, the identifier analogously operates, in other implementations, to identify the possible paths in a three or greater fault scenario. The identifier identifies, for instance, each fault transition to a fault state and each remediation transition to a remediation state. A hazard level is associated with the fault and remediation. The value of the hazard represents an indicia of potential deleterious result that potentially occurs due to operation of the transmission in a particular state.

The hazard scorer 58 operates to provide a hazard score for each of the possible paths identified by the identifier. In various implementations, the hazard score that is generated by, or otherwise derived by, the hazard scorer is, in one implementation, a single value. In other implementations, the hazard score is represented in other manners, such as by a multiple number representation that permits, for instance, a maximum, or minimum, analysis to be performed upon component parts of the score. The hazard scores and related path information, in one implementation, form data entries of an Excel™-based spreadsheet.

The sorter 62 operates to sort the hazard scores formed by the hazard scorer 58. The sorter, for instance, lists the scores in numerical order from best to worst, e.g., lowest hazard level to highest hazard level. The sorted values, and their associated paths are analyzed, either automatically, or manually, and the state control scheme is formed. The state control scheme 64 is implementable as the state control scheme 46 forming part of the controller 42 shown in FIG. 1. Through use of the apparatus 52 to form the state control scheme that is used by the controller 42, state control implemented by the controller, such as by controlling the positioning of the valves 48, with monitoring by the pressure sensors 50, causes operation of the transmission to comport with the state control set forth in the state control scheme. The on-off combination of the valves 48 and the sensors present a finite set of states, represented in FIG. 1 by the states 14, 22, 26, 34, and 38 that are available both in normal operation and in the faulted and remediated states.

In one implementation, the iterations carried out by the identifier, the hazard scoring performed by the hazard scorer, and the sorting performed by the sorting to provide for the creation of the state control scheme 64 are carried out by computer-based manipulation of input information. When implemented in this manner, as well as in other manners, the input information that is used in the identification and hazard scoring procedures includes identification of the set of all possible transmission states, identification of all possible faults, identification of an assigned hazard level for each state, identification of the possible faults, including false detection of faults, together with pre-programmed, or other, remedial actions for each fault, and identification of a list of hazardous transitions are all input identifications provided to the apparatus to permit its operation to analyze the operation of the transmission under multiple-fault occurrences.

Figure 3:
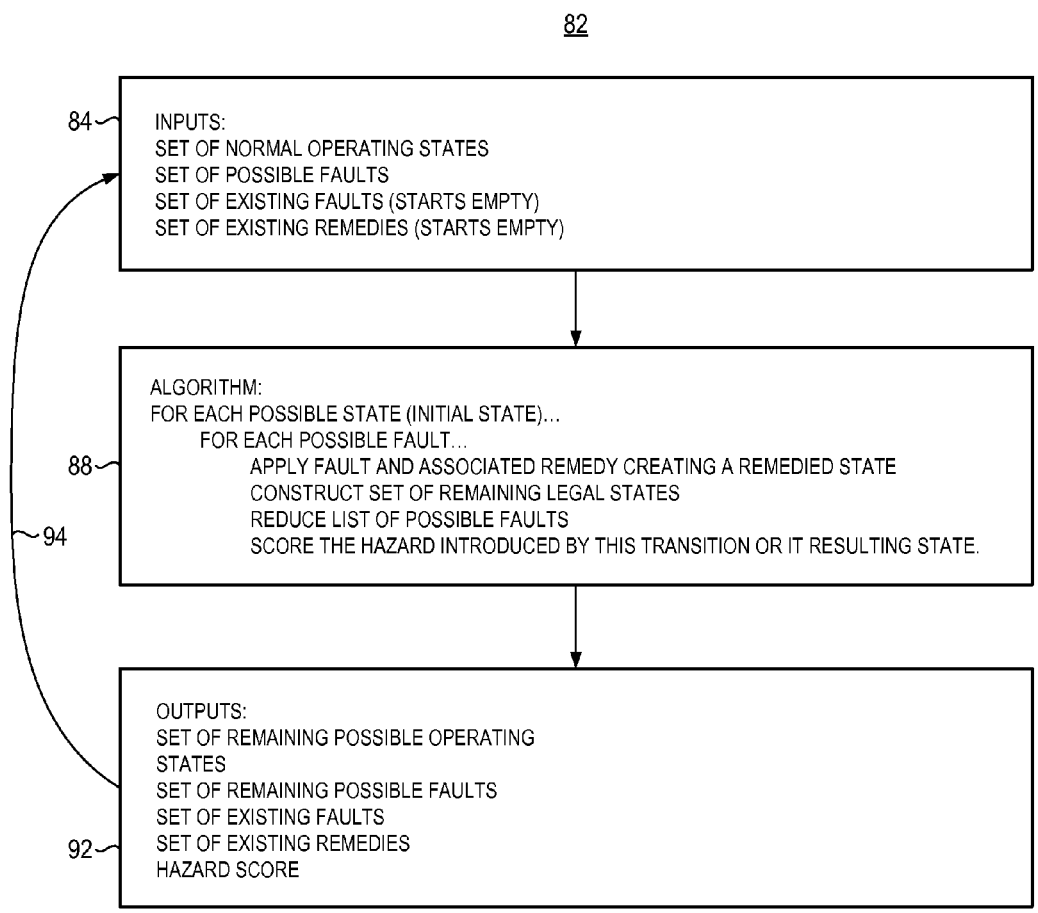
FIG. 3 illustrates a process diagram representative of the process of operation of an embodiment of the present invention.

FIG. 3 illustrates a process diagram shown generally at 82, representative of an exemplary process by which to analyze state operation of the transmission 10, shown in FIG. 1, or other multi-state device to permit creation of a state control scheme as a result thereof. The process is, e.g., as an algorithm executable by processing circuitry. The input information needed to identify the possible paths for a multiple-fault-occurrence scenario with remediation and subsequent analysis thereof is provided at the block 84. The inputs include a set of normal operating states, a set of possible faults, a set of existing faults, and a set of existing remedies. Initially, the set of existing faults is empty, and the set of existing remedies is also empty.

Then, and as indicated by the block 88, for each possible state, i.e., initial state or normal operating state, each possible fault is induced. An associated remedial action is also applied, resulting in a remediated, i.e., remedied, state. The hazard introduced by the fault and remedy are scored as the greater of the either: the inherent hazard of the remediated state and the hazard created by inadvertently transitioning from the initial state to the remediated state. This constitutes the first fault. The block 88 indicates, for each possible fault, the operations of applying the fault and associated remedy (or remedies), to create a remediated state, constructing a set of remaining legal, i.e., allowable states, reducing a list of possible faults, and scoring the hazard introduced by the transition or its resulting state.

As indicated by the block 92, outputs generated include a set of remaining possible operating states, a set of remaining possible faults, a set of existing faults, a set of existing remedies, and a hazard score. Iterative operation commences, or continues, as indicated by the segment 94 extending back to the block 84. The combination of the prior fault and prior remedial action limits the number of remaining states into which the vehicular transmission, or other multi-state device operates. The set of faults of the inputs identified at the block 84 is reduced to exclude the existing fault. The set remaining possible states, remaining possible faults, and existing remedies, are re-applied, and the functions carried out at the block 88 are again performed.

The hazard score of the resulting remediated state is recorded as the second-level fault analysis along with the list of states and faults leading thereto. In the exemplary implementation, a two-fault scenario is analyzed. If additional fault-occurrence analysis is desired, additional iterations are carried out.

Results are provided, e.g., in electronic form permitting sorting by hazard level to determine the effectiveness of the remediation strategy. Analysis is also useful for reviewing fault handling of scenarios of specific interests.

Figure 4:
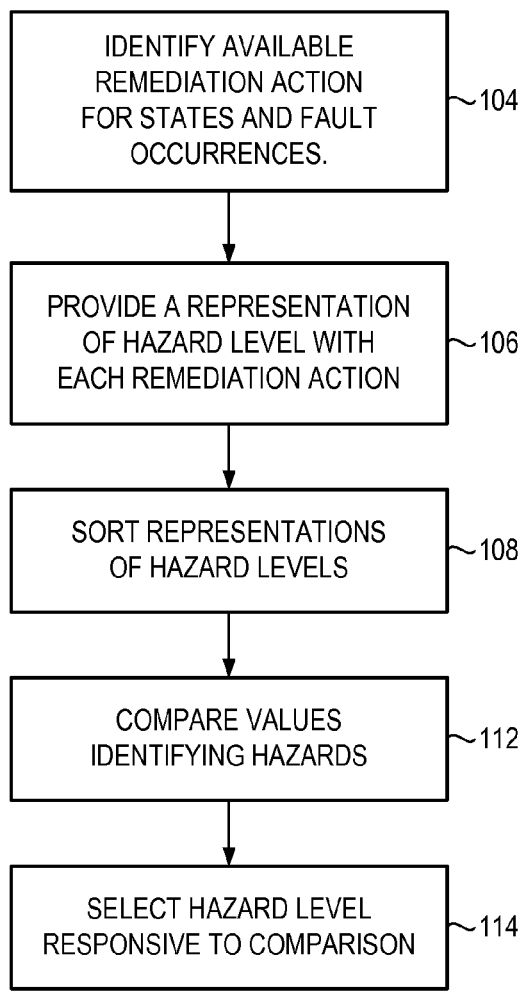
FIG. 4 illustrates a method flow diagram representative of the method of operation of an embodiment of the present invention.

FIG. 4 illustrates a method flow diagram, shown generally at 102, representative of the method of operation of an embodiment of the present invention. The method facilitates analysis of a multiple-state device responsive to multiple fault occurrence.

First, and as indicated by the block 104, available remediation action is identified for states of the multiple-state device and fault occurrences at the states. Then, and as indicated by the block 106, a representation of a hazard level associated with each available remediation action is provided.

Then, and as indicated by the block 108, representations of the hazard levels associated with the available remediation actions are sorted. And, as indicated by the block 112, the value identifying the hazard associated with the erroneous undertaking is compared. Then, and as indicated by the block 114, the representation of the hazard level is selected responsive to the comparisons.

Thereby, a manner is provided by which better to analyze all possible path sequences of a vehicular, automotive transmission or other multiple-state device. Through quantitative analysis of each of the path sequences, a preferred state control scheme is obtained. When implemented by a controller, the transmission or other multiple-state device is caused to be operated in conformity with the preferred control scheme.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. An apparatus for facilitating analysis of a multiple-state device responsive to multiple fault occurrence, said apparatus comprising:
    an identifier module in an electronic control device configured to automatically identify, during operation of the multiple-state device and in response to an occurrence of multiple detected faults in said multiple state device, a plurality of automatic remediation actions available to the multiple state device for states of the multiple-state device and fault occurrences possible at the states; and
    a hazard scorer module in said electronic control device configured to automatically provide a representation of a hazard level associated with each available remediation action,
    in which a hazard level represents an indicia of potential deleterious results that may occur due to operation of the multiple-state device in a state defined by the remediation action.

2. The apparatus of claim 1 wherein the multiple-state device comprises an automotive transmission and wherein said identifier is configured to identify, for states of the automotive transmission and fault occurrences possible at the states, the available remediation actions.

3. The apparatus of claim 2 wherein the states of the automotive transmission comprise gear-position-associated states.

4. The apparatus of claim 1 wherein said identifier module is further configured to identify each remediation state associated with each available remediation action.

5. The apparatus of claim 4 wherein the fault occurrences possible at the states further comprise sequential fault occurrences and wherein said identifier module is further configured to identify fault occurrences possible at each remediation state.

6. The apparatus of claim 5 wherein said identifier module is further configured to identify available remediation action for each remediation state and fault occurrences possible at each remediation state.

7. The apparatus of claim 6 wherein the representation of the hazard level provided by said hazard scorer is further associated with each available remediation action for each remediation state.

8. The apparatus of claim 1 wherein the representation of the hazard level is of a value responsive to at least one of:
    a value identifying a hazard associated with the available remediation action; and
    a value identifying a hazard associated with erroneous undertaking of the available remediation action.

9. The apparatus of claim 1 wherein said identifier module and said hazard scorer module are configured to operate iteratively.

10. The apparatus of claim 1 wherein the representation of the hazard level provided by said hazard scorer is representative of an available remediation action subsequent to the multiple fault occurrence.

11. The apparatus of claim 10 wherein the multiple fault occurrence comprises successive faults from successive device states.

12. The apparatus of claim 1, further comprising a sorter module to sort representations of hazard levels associated with the remediation actions.

13. A method for facilitating analysis of a multiple-state device responsive to multiple fault occurrence, said method comprising:
    responsive to an occurrence of multiple detected faults in said multiple state device and during operation of the multiple-state device, identifying with an electronic control device a plurality of automatic remediation actions available to the multiple state device for states of the multiple-state device and fault occurrences at the states; and
    automatically providing a representation of a hazard level associated with each available remediation action with said electronic control device,
    in which a hazard level represents an indicia of potential deleterious results that may occur due to operation of the multi-state device in a state defined by the remediation action, and
    in which the remediation action taken is a change in a current operation of an apparatus operated by the multiple-state device.

14. The method of claim 13 wherein said identifying comprises identifying available remediation action subsequent to the multiple fault occurrence.

15. The method of claim 14 where the multiple fault occurrence comprises occurrence of sequential faults.

16. The method of claim 13 wherein said identifying and said providing are performed iteratively.

17. The method of claim 13 wherein the representation of the hazard level is further of a value responsive to
a value identifying a hazard associated with the available remediation action.

18. The method of claim 17 further comprising the operations of:
comparing, with said electronic control device, the value identifying the hazard associated with the available remediation action and the value identifying the hazard associated with the erroneous undertaking; and
selecting, with said electronic control device, the representation of the hazard level responsive to comparisons made during said comparing.

19. The method of claim 13, further comprising sorting, with said electronic control device, representations of hazard levels associated with the remediation actions.

20. An electronic multiple failure mode analyzer for analyzing a multiple-state, vehicular transmission under a multiple fault condition, said analyzer comprising:
electronic processing circuitry implementing:
a modeler configured to model, for each state of the multiple-state vehicular transmission, every possible multiple fault condition and available remediation action responsive thereto;
a hazard level assignor configured to assign a hazard level for each possible multiple fault condition and available remediation action responsive thereto;
a hazard scorer to:
compare a value identifying a hazard associated with the available remediation action and a value identifying a hazard associated with an erroneous undertaking; and
select the representation of the hazard level responsive to comparisons made during said comparing,
in which a hazard level represents an indicia of potential deleterious results that may occur due to operation of the multi-state device in a state defined by the remediation action, and
in which the remediation action taken is a change in the operation of an apparatus operated by the multiple-state device.

* * * * *